(12) United States Patent
Gordon

(10) Patent No.: US 8,054,312 B2
(45) Date of Patent: Nov. 8, 2011

(54) MATERIAL FOR MOTION CAPTURE COSTUMES AND PROPS

(75) Inventor: Demian Gordon, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 454 days.

(21) Appl. No.: 11/467,498

(22) Filed: Aug. 25, 2006

(65) Prior Publication Data

US 2007/0200930 A1 Aug. 30, 2007

Related U.S. Application Data

(60) Provisional application No. 60/711,847, filed on Aug. 26, 2005, provisional application No. 60/711,967, filed on Aug. 26, 2005, provisional application No. 60/711,910, filed on Aug. 26, 2005, provisional application No. 60/711,850, filed on Aug. 26, 2005, provisional application No. 60/711,911, filed on Aug. 26, 2005, provisional application No. 60/753,513, filed on Dec. 23, 2005, provisional application No. 60/807,058, filed on Jul. 11, 2006.

(51) Int. Cl.
 *G06T 13/00* (2011.01)
 *G03B 21/32* (2006.01)
 *H04N 5/222* (2006.01)

(52) U.S. Cl. .......................... 345/474; 352/87; 348/722

(58) Field of Classification Search .......... 345/473–475; 352/87; 348/722
 See application file for complete search history.

(56) References Cited

U.S. PATENT DOCUMENTS

| | | | | |
|---|---|---|---|---|
| 2,442,749 | A | * | 6/1948 | Callahan et al. ..................... 2/87 |
| 4,885,844 | A | * | 12/1989 | Chun ................................. 33/15 |
| 5,550,928 | A | | 8/1996 | Lu et al. |
| 6,061,644 | A | | 5/2000 | Leis |
| 6,131,205 | A | * | 10/2000 | Arem ................................ 2/250 |
| 6,144,366 | A | | 11/2000 | Numazaki et al. |
| 6,522,332 | B1 | * | 2/2003 | Lanciault et al. ............. 345/473 |
| 6,546,309 | B1 | * | 4/2003 | Gazzuolo ...................... 700/132 |
| 6,842,175 | B1 | * | 1/2005 | Schmalstieg et al. ......... 345/427 |
| 7,039,486 | B2 | * | 5/2006 | Wang ........................... 700/117 |
| 7,428,976 | B2 | * | 9/2008 | Cheng et al. .................. 220/642 |
| 2004/0005004 | A1 | | 1/2004 | Demos |
| 2004/0063481 | A1 | | 4/2004 | Wang |
| 2004/0155962 | A1 | * | 8/2004 | Marks .......................... 348/169 |
| 2006/0055699 | A1 | * | 3/2006 | Perlman et al. .............. 345/473 |
| 2006/0126928 | A1 | * | 6/2006 | Edwards et al. ............. 382/154 |
| 2007/0102636 | A1 | | 5/2007 | Boyer et al. |

OTHER PUBLICATIONS

Brett Allen, Brian Curless, Zoran Popovi, The space of human body shapes: reconstruction and parameterization from range scans, ACM Transactions on Graphics (TOG), v.22 n.3, Jul. 2003.*

(Continued)

*Primary Examiner* — Justin P Misleh
(74) *Attorney, Agent, or Firm* — Samuel S. Lee; Procopio, Cory, Hargreaves & Savitch LLP

(57) ABSTRACT

Capturing motion using motion capture cameras comprises: coupling a plurality of markers to an actor; allowing a material to be positioned between the actor and the motion capture cameras, wherein the material is selected to allow the motion capture cameras to capture motion of the plurality of markers while the actor interacts with the material; and capturing the motion of the markers.

19 Claims, 3 Drawing Sheets

OTHER PUBLICATIONS

Dieter Schmalstieg, L. Miguel Encarnação, Zsolt Szalavári, Using transparent props for interaction with the virtual table, Proceedings of the 1999 symposium on Interactive 3D graphics, p. 147-153, Apr. 26-29, 1999, Atlanta, Georgia, United States.*

Daisaku Arita et al., "RPV-II: A Stream-Based Real-Time Parallel Vision System and Its Application to Real-Time Volume Reconstruction", Proceedings of the Second International Workshop on Computer Vision Systems, p. 174-189, Jul. 7-8, 2001, figures 1, 3, 4, 8, and pp. 175, 178, 179, 181, 184, and 185.

L. Herda et al., "Using Skelton-Based Tracking to Increase the Reliability of Optical Motion Capture", Human Movement Science, 2001. http://citeseer.ist.psu.edu/herda01using.html, figures 1a and 1b, abstract, and pp. 1-3 and 19.

Eftychios Sifakis et al., "Automatic Determination of Facial Muscle Activations From Sparse Motion Capture Marker Data", ACM Transactions of Graphics (TOG), v. 24 n. 3, Jul. 2005, figure 1.

Franco, J.-S., et al., "A Distributed Approach for Real Time 3D Modeling", In Proceedings of the IEEE Workshop on Real Time 3D Sensors and Their Use. 2004.

Office Action issued in U.S. Appl. No. 11/467,506, filed Sep. 18, 2008.

Office Action issued in U.S. Appl. No. 11/467,503, filed Dec. 9, 2008.

Office Action issued in U.S. Appl. No. 11/467,494, filed Sep. 10, 2009.

* cited by examiner

MATERIAL FOR MOTION CAPTURE COSTUMES AND PROPS

CROSS-REFERENCE TO RELATED APPLICATIONS

This application claims the benefit of priority of U.S. Provisional Patent Application No. 60/711,967, entitled "Material for Motion Capture Costumes and Props," U.S. Provisional Patent Application No. 60/711,847, entitled "Underwater Motion Capture," U.S. Provisional Patent Application No. 60/711,910, entitled "Movie Set Survey Using Motion Capture Cameras Capturing Lights Fixed to the Set," U.S. Provisional Patent Application No. 60/711,850, entitled "Using Wavefront Coding in Motion Capture," U.S. Provisional Patent Application No. 60/711,911, entitled "Automatic Target Tracking in Motion Capture," all five applications filed Aug. 26, 2005, U.S. Provisional Patent Application No. 60/753,513, entitled "Motion Capture with Clear Focus," filed Dec. 23, 2005, and U.S. Provisional Patent Application No. 60/807,058, entitled "Motion Capture using Quantum Nanodots," filed Jul. 11, 2006. The disclosures of the above-referenced patent applications are hereby incorporated by reference.

BACKGROUND

The present invention relates generally to motion capture, and more particularly to materials useful for costumes and props in motion capture.

A typical motion capture system includes multiple fixed cameras surrounding a volume of space. The cameras record the movement of markers attached to a target, such as a person. Based on the recorded movement, a model of the target's motion can be derived and then used for generating a graphical representation of that movement, such as in a movie or video game.

However, in the motion capture process, the actor often cannot interact with costumes and props because the costumes and props obscure the markers from view of the motion capture cameras.

Therefore, what is needed is a system and method that overcomes these problems found in the typical systems as described above.

SUMMARY

Implementations of the present invention include systems and methods for enabling motion capture while an actor interacts naturally with an object.

In one implementation, capturing motion using motion capture cameras comprises: coupling a plurality of markers to an actor; allowing a material to be positioned between the actor and the motion capture cameras, wherein the material is selected to allow the motion capture cameras to capture motion of the plurality of markers while the actor interacts with the material; and capturing the motion of the markers.

In another implementation, a system for capturing motion using motion capture cameras comprises: a plurality of markers coupled to an actor; a plurality of motion capture cameras configured to capture motion of the plurality of markers; and a material allowed to be positioned between the actor and the plurality of motion capture cameras, wherein the material is selected to allow the plurality of motion capture cameras to capture motion of the plurality of markers while the actor interacts with the material.

In another implementation, the material includes a fabric. In yet another implementation, the material includes a metal mesh.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain implementations as disclosed herein provide for systems and methods enabling motion capture while an actor interacts naturally with an object. In one implementation, the actor interacts with a substantially transparent fabric. In another implementation, the actor interacts with a substantially transparent theatrical prop.

After reading this description it will become apparent to one skilled in the art how to implement the invention in various alternative implementations and alternative applications. Although various implementations of the present invention will be described herein, it is understood that these implementations are presented by way of example only, and not limitation. As such, this detailed description of various alternative implementations should not be construed to limit the scope or breadth of the present invention as set forth in the appended claims.

Figure 1:
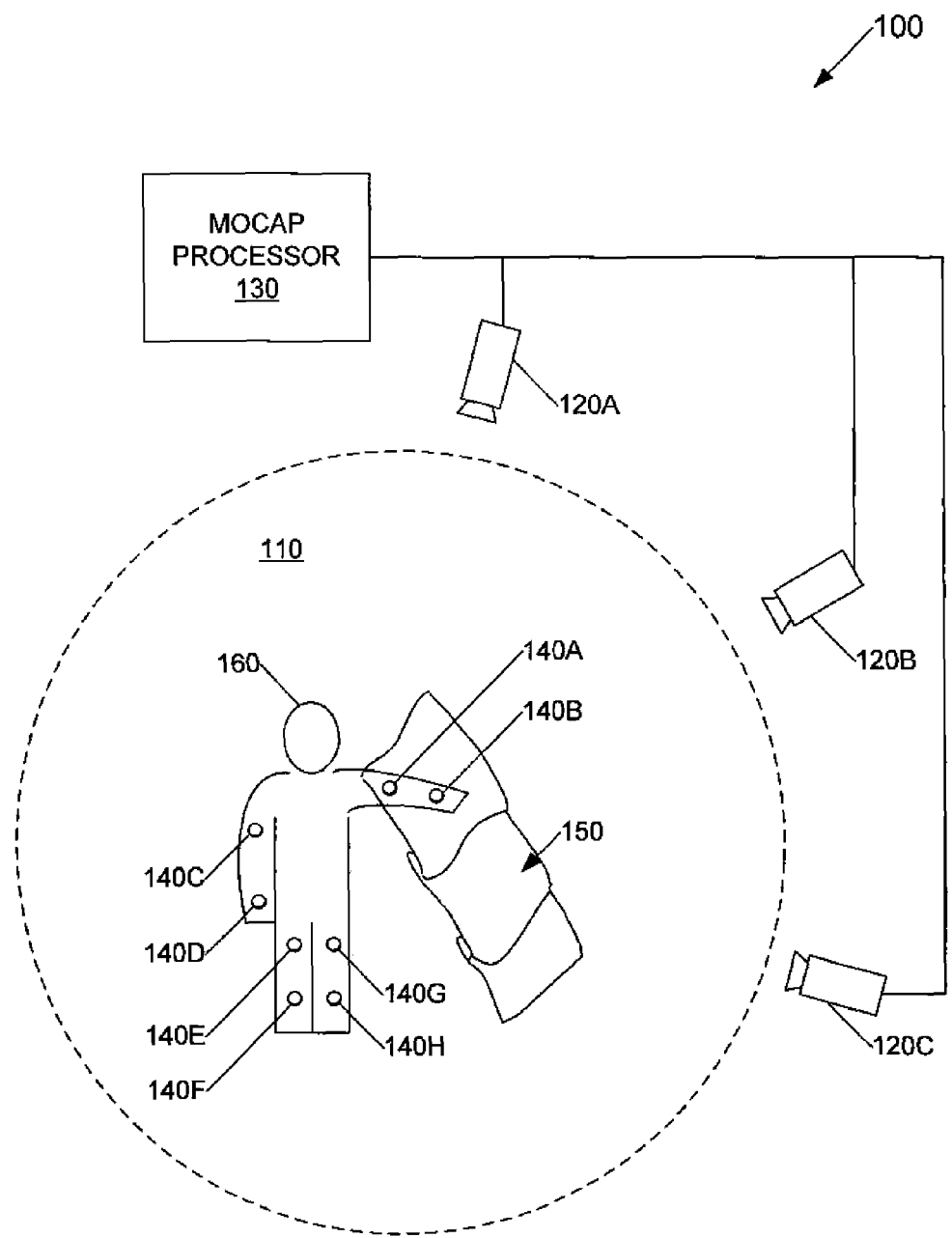
FIG. 1 is a block diagram illustrating an example motion capture system including a substantially transparent fabric.

FIG. 1 is a block diagram illustrating an example motion capture system 100 including a substantially transparent fabric 150. As depicted, the motion capture system 100 includes a capture space 110, motion capture cameras 120A-C, a motion capture processor 130, markers 140A-H, a substantially transparent fabric 150, and an actor 160.

The capture space 110 is the volume in which the motion capture cameras 120A-C capture motion. Markers 140A-H are coupled to the actor 160 and the actor 160 performs within the capture space 110. The motion capture processor 130 receives frames of image data from the motion capture cameras 120A-C and integrates them to generate three-dimensional ("3-D") volume data representing a model of the actor's movements during performance.

In one implementation, the markers 140A-H coupled to the body of the actor 160 are small retro-reflective spheres. The capture space 110 is illuminated with high power lights, and the markers 140A-H reflect the illumination as bright points of light which are captured in the image data generated by the motion capture cameras 120A-C. Alternatively, the motion capture cameras 120A-C may each be equipped with LEDs emitting light directed into the capture space 110 for reflection by the markers 114A-H. In another implementation, the markers are quantum nano-dots configured to emit light at a specific wavelength (i.e., color) when illuminated by another light.

In the scene to be captured, the actor 160 interacts with a fabric object 150. For example, a fabric object 150 might represent a sheet, banner, flag, or curtain. Alternatively, the fabric object 150 may be a cape, coat, or another garment. While the actor 160 performs, the fabric object 150 may get positioned between the two markers 140A-B and the motion capture cameras 120A-C, blocking the line of sight between the motion capture cameras 120A-C and the two markers 140A-B. Because the fabric object 150 is substantially transparent, the light reflected by the two markers 140A-B is allowed to pass and be captured by the motion capture cameras 120A-C. Since the fabric object 150 is substantially invisible to the motion capture cameras 120A-C, the actor 160 can perform physical movements that appear natural for a person interacting with such a section of fabric while allowing the cameras to capture the movement of the markers 140A-B. Otherwise, the actor 160 must simulate these interactions, much as would a mime, without the sensory feedback provided by manipulations of real fabric.

In one implementation, the fabric object 150 is a garment. Wearing the fabric object 150 as a garment allows the actor 160 to perform subtle movements involved in such activities, for example, as putting on a coat, adjusting a lapel, buttoning up the front of the coat, or feeling about the inside of a coat pocket for some item.

In one implementation, the fabric object 150 is made of tulle, a fabric commonly used to make the skirt of a ballerina's tutu. Tulle is a type of fine netting usually made of nylon or silk, and has the characteristic of allowing light to substantially pass through without blocking. In another implementation, the fabric object 150 has one or more markers including quantum nano-dots configured to emit light at a specific wavelength (i.e., color) when illuminated by another light. For example, quantum nano-dots of one color can be used to make a random pattern on the fabric object 150 while quantum nano-dots of another color can be used for the body markers 140A, 140B disposed underneath the fabric object. This allows the capture of the shape of the fabric object 150 and the movement of the body markers 140A, 140B on the actor 160.

It will be appreciated that the fabric object 150 includes many other types of sheer, transparent, and semi-transparent fabrics and materials.

Figure 2:
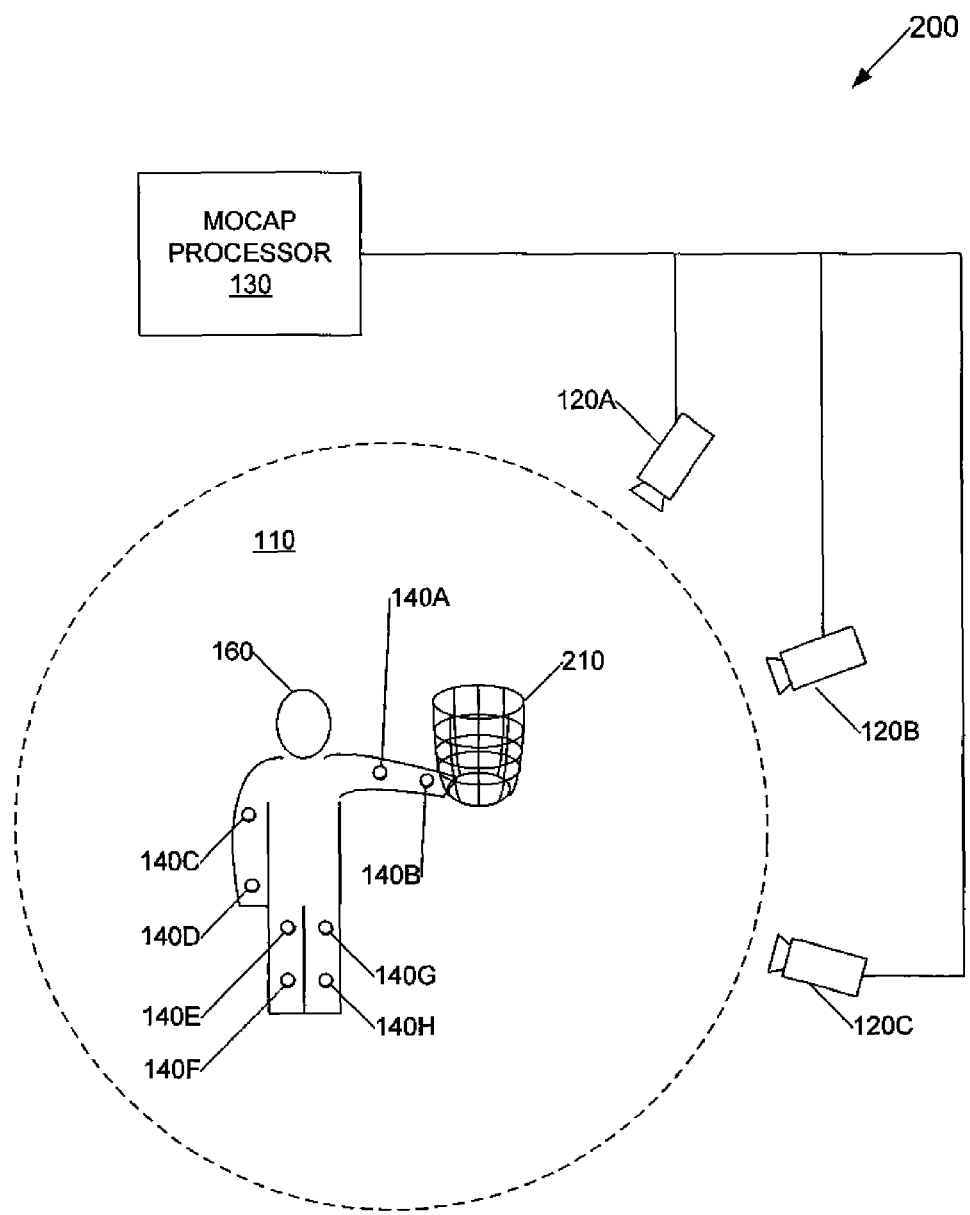
FIG. 2 is a block diagram illustrating an example motion capture system including a substantially transparent theatrical prop.

FIG. 2 is a block diagram illustrating an example motion capture system 200 including a substantially transparent theatrical prop 210. As depicted, the motion capture system 200 includes a capture space 110, motion capture cameras 120A-C, a motion capture processor 130, markers 140A-H, a substantially transparent theatrical prop 210 ("prop"), and an actor 160.

As discussed above in relation to FIG. 1, the capture space 110 is the volume in which the motion capture cameras 120A-C capture motion. Markers 140A-H are coupled to the actor 160 and the actor 160 performs within the capture space 110. The motion capture processor 130 receives frames of image data from the motion capture cameras 120A-C and integrates them to generate 3-D volume data.

A plurality of markers 140A-H is coupled to the actor. In one implementation, the markers 140A-H are small retro-reflective spheres and the capture space 110 is illuminated with high power lights under which the markers 140A-H reflect bright points of light captured by the motion capture cameras 120A-C. Alternatively, the motion capture cameras 120A-C may each be equipped with LEDs emitting light directed into the capture space 110 for reflection by the markers 114A-H. In another implementation, the markers are quantum nano-dots configured to emit light at a specific wavelength (i.e., color) when illuminated by another light.

In the performance to be captured, the actor 160 interacts with the prop 210 representing some object. For example, the character that the actor 160 portrays may interact with a basket or large bowl, as depicted in FIG. 2. While the actor 160 performs, the prop 210 may get placed between two markers 140A-B and the motion capture cameras 120A-C, blocking the line of sight between the motion capture cameras 120A-C and the two markers 140A-B. Because the prop 210 is substantially transparent, the light reflected by the two markers 140A-B that would otherwise be blocked is allowed to pass and be captured by the motion capture cameras 120A-C. That is, the prop 210 is substantially invisible to the motion capture cameras 120A-C, and the actor 160 can perform physical movements that appear natural for a person interacting with an object represented by the prop 210. Otherwise, the actor 160 must simulate these interactions without the sensory feedback that manipulations of a real object would provide.

In one implementation, the prop 210 is made of a metal mesh and can be molded readily into various shapes. Handling the prop 210 made of the metal mesh, or alternatively, a metal screen or wire frame, allows the actor 160 to perform subtle and natural movements not otherwise possible. Further, the prop 210 need not be molded exactly, but only approximately. The motion of the actor 160 will be captured, but once digitized, the model of the actor 160 can be configured to hold a variety of virtual objects that may or may not be shaped as the prop 210 is shaped.

Figure 3:
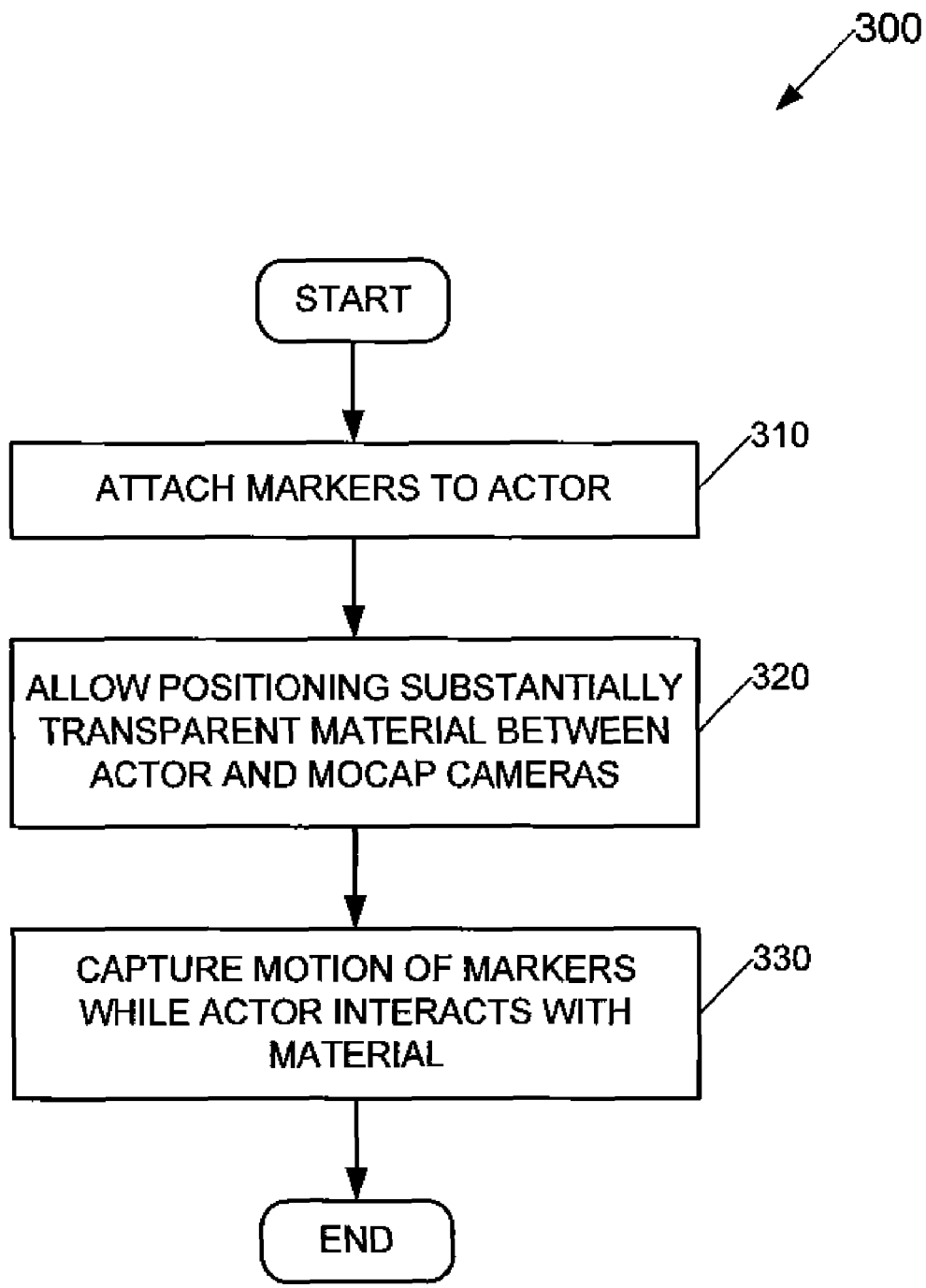
FIG. 3 is a flowchart of a method of motion capture using a substantially transparent material.

FIG. 3 is a flowchart 300 of a method of motion capture using a substantially transparent material.

At 310, markers are attached to an actor. The markers include several types of markers used for motion capture. In one implementation, the markers are retro-reflective spheres whose reflections under stage illumination appear as bright points of light. The bright points of light are captured by motion capture cameras, which generate frames of image data that are integrated to generate data points modeling the locations and movements of the markers in a virtual 3-D volume. Additionally, the markers include other optical markers, such as LEDs and glow-in-the-dark markers. In another implementation, the markers are quantum nano-dots configured to emit light at a specific wavelength (i.e., color) when illuminated by another light.

At 320, a substantially transparent material is allowed to be positioned between the actor and the motion capture cameras. The substantially transparent material is generally configured to function as an object with which the actor interacts during his or her performance. In one implementation, the substantially transparent material is thin enough to be made into clothing, and transparent enough to be substantially invisible, i.e., undetectable, to the motion capture cameras. Such a substantially transparent material generally includes a mesh having proportionally small interstices and large grid openings. For example, the substantially transparent material can be a fabric such as tulle, which is a net-like material commonly used to make ballet tutus, as discussed above.

At 330, the motion of the markers attached to the actor is captured while the actor interacts with the substantially transparent material.

The benefits of using a substantially transparent fabric in motion capture include enabling the actor to interact physically with the material to provide a realistic and natural performance not achievable otherwise. For example, an actor may be required to run while wearing a long flowing dress. Wearing such a dress made of the substantially transparent fabric naturally constrains the movements of the actor to movements of one running in such a garment. Related movements might include grasping and lifting the hem of the dress in order to run. The actor therefore does not have to simulate the running without the dress, thereby risking a performance appearing unnatural. Additionally, the substantially transparent fabric can include markers using quantum nano-dots configured to emit light at a specific wavelength (i.e., color) when illuminated by another light.

Further, costumes and garments made for actors provide additional spatial volume associated with an actor that other actors will naturally avoid during a performance. For example, actors will generally avoid stepping on the long train of a wedding dress trailing behind another actor.

In another example, a prop can be a rope, or similar object, functioning essentially as a "fabric" having a single strand. This can be used by an actor to simulate the edge of a fabric sheet, for instance, such as when the actor portrays throwing back a blanket and springing out of bed.

In another implementation, the substantially transparent material includes a metal mesh. In one example, the metal mesh is made of a flexible metal which can be formed into a variety of shapes. The metal mesh has properties similar to tulle, discussed above, but with additional resistance to tearing and other forces. Alternatively, a less flexible metal mesh is used to construct relatively rigid theatrical props, thus providing an actor with a physical object with which to interact during a performance. Theatrical props thus constructed will not block the view of the markers attached to the actor.

In another example, an object formed of such a flexible metal mesh is a large cup. The movements of the actor's hand while manipulating the large cup are captured by the motion capture cameras unblocked by the cup. The actor's hand movements can then be applied to any virtual cup or hand-held object, for instance, during post-processing.

In another implementation, a relatively rigid metal mesh can be used to form an object such as a table or door. The actor may push or pull such an object to create natural and realistic movements without the object blocking the view from the motion capture cameras of any markers attached to the actor. Further, metal meshes having differently sized grids can be used together. For example, a metal mesh having a smaller grid can be used to support a small cup on the top of a table prop formed of a metal mesh having a larger grid. The larger grid would otherwise not support the cup because the cup might fall through or stand crookedly on the larger grid.

In one implementation, a system can be configured for underwater motion capture, the system including a tank, multiple motion capture cameras, and a motion capture processing system. The tank is a large tank (square or rectangular) of clear water with flat, non-reflective PLEXIGLAS sides. The inside walls of the PLEXIGLAS tank are made of non-reflective material or are painted such that they are substantially non-reflective. The floor and walls of the tank include lights (e.g., small lights) in a grid pattern. Preferably high megapixel cameras (e.g., 24P digital cameras or machine vision style cameras) are mounted in the floor and walls underneath, around, and above the perimeter of the tank. Some or all of the cameras are placed at the waterline level. Alternatively, the cameras are placed at two or more levels. In one implementation, the cameras are not equipped with ring lights of LEDs to illuminate retro-reflective markers. Markers are configured such that several waterproof LEDs are encased in a waterproof ping-pong ball style diffuser housing. Using multiple LEDs in a sphere avoids directional issues inherent to a single LED marker, and can also uniquely identify an actor, body part or object. Camera lens distortions are determined by turning on the small lights in the grid pattern and recording video with each camera. The grid pattern of the lights is used to correct for distortion caused by the water, the tank, or the lens of the camera. During a typical motion capture shot, the grid lights are turned off, though some small number of the grid lights can be left on all the time as tracking dots in case of calibration loss. The actor wears a scuba suit with the markers attached (e.g., the LEDs inside the ping pong ball diffuser) turned on. The ping-pong ball enclosures light up and are seen by the cameras as if they were retro-reflective markers.

In another implementation, an underwater motion capture system uses a similar tank, but in which the walls and floor are painted white. Actors wear a white suit and relatively small black rubber spheres for markers. Alternatively, markers are round discs of black plastic or rubber with a white spot in the center. Actors can also wear a re-breather to substantially reduce bubbles due to their breathing from entering the water and interfering with capture of the markers. The white-suited actor and the white background provide a high contrast environment in which the black spheres stand out easily. Lens distortion can be determined by waving a wand with markers on it. A motion control robotic arm with markers on it can be substituted for the grid of lights. An arm can descend from the ceiling and "swizzle" the water while the cameras capture the movement of the wand as it is waved back and forth in a grid pattern.

Alternative implementations include using a flesh or light colored wetsuit with markers (e.g., tape, spheres, printing or silkscreen on material) to indicate bone structure to assist in developing a skeletal model of an actor. A light colored material provides higher contrast. A random pattern can be applied to the suit to be triangulated by the various motion capture cameras and digitized into a geometry that moves over time, thus generating a model and performing motion capture at the same time. The tank walls and floor can be configured to allow an actor to walk in and out of the water. Out-of-water portions can be captured separately using a separate system in the same tank volume, or shot separately in different volumes emulating water (e.g., a pool of plastic spheres). Similar methods of separate motion capture can apply for capturing an actor diving into water, or an action occurring at water surface. Finally, the walls of the underwater tank can be clear.

In another implementation, a system can be configured for surveying a movie set using lights fixed to the set and motion capture cameras configured to capture the locations of the lights fixed to the set.

Various implementations include generating a poly model using the set of lights fixed to set positions and shapes. A set survey can be done while the motion capture is going on because a motion capture system is essentially a large digitizer. Small lights can be built into the set like a string of Christmas tree lights around the perimeter of a prop or set. These lights are kept off most of the time. When the set is used for shooting a scene, the object is placed on the set, and the lights are turned on. The motion capture system records the positions of the lights and "observes" the shape of the object. The position of each light is captured by the motion capture system. The position is triangulated and the data are generated at the locations of the lights. The locations of the lights are established in a 3-D virtual space and can be used to create a rough poly model of the object. The 3-D models can be constrained to the data points generated by each light by the 3-D processing software. The lights replace, or are used in addition to, the markers that are visible at all times to track motion.

Alternatively, two types of lights can be used. The first type defines the entire shape of object. The second type marks object locations. For example, a string of the first type of lights is placed around the edge of a table top, and four lights of the second type are placed at respective edges of the surface. The first set is turned on once to capture the object's shape for a digital model of the object. The second set is on all the time to track the location and motion of the object. The two sets can be combined by having some lights in the set stay on all the time while the others are turned on when needed.

In another implementation, the set surveying system includes a light placed on the inside of a hinged marker. A marker is attached to a surface. When the hinge is open, the light is exposed. When the hinge is closed, the light is hidden. The hinged marker can be removable or built-in. In another implementation, the lights are quantum nano-dots configured to emit light at a specific wavelength (i.e., color) when illuminated by another light.

Wavefront coding can be used to aid camera focus in motion capture. According to this method, all subjects in the image appear to be in focus, regardless of the actual depth of field relative to the camera lens. In one implementation, focus can be eliminated at any distance from the camera by adding a small device to the inside of a normal camera lens and then performing image processing.

In another implementation, wavefront coding used in conjunction with motion capture can resolve objects anywhere in the camera's field of view to provide substantially crisp, in-focus images.

In another implementation, wavefront coding adds a prism-like device inside a normal lens. The resulting image is decoded using a "backend" software module.

In another implementation, wavefront coding related devices are used for motion capture in a head-mounted device. Wavefront coding ensures that the entire face is in focus.

In another implementation, shooting background plates with no focal problems and infinite depth of field and adding the defocus effects in post processing results in fewer background plates needing to be shot.

In another implementation, wavefront coding is used for onset survey photography, for texture reference shooting, and anything where photographic elements are taken of objects and focus is an issue that must typically be overcome by taking multiple photos of things or places.

Automatic target tracking can be used to aid motion capture. In one implementation, motion capture cameras mounted on servo motor-driven pan and tilt heads are used to automatically track actors. In another implementation, a radio frequency ("RF") tag on an actor allows motion capture cameras to track a particular actor as their subject interest. Alternatively, different color LEDs are used to track different actors and props.

In another implementation, mounting cameras with servo controlled pan and tilt heads enables an entire motion capture system to function essentially as a motion-controlled motion capture system.

In another implementation, fewer cameras are needed to do face and body motion capture because each actor has a volume that essentially follows him or her around the capture space, instead of using an extensive array of fixed interest motion capture cameras.

In another implementation, the volume size achievable with motion capture cameras mounted on servo motor-driven pan tilt heads is substantially increased over that which is otherwise achievable only with hundreds of additional cameras. Camera setup time and production costs are thereby reduced.

In another implementation, quantum nano-dots of various colors are used to uniquely identify actors for automatic target tracking.

In an alternative implementation, target coverage responsibility is passed between cameras. For example, cameras have zones of coverage, and when an actor moves from one zone to another the responsibility for covering that actor changes from camera to camera. The handoff can be controlled by a separate system or by a peer-to-peer camera interaction.

In one implementation, motion capture is improved with the use of specialized cameras for clear focus. One or more light field cameras (also known as "plenoptic" cameras) are used to capture image data with which digital models of actors and services are built, such as for computer animation. An example of a light field camera is discussed in the article "Light Field Photography With A Hand Held Plenoptic Camera" by Ren Ng, et al., published in Stanford University Computer Science Tech Report CSTR 2005-02, April 2005.

One implementation includes one or more programmable processors and corresponding computer system components to store and execute computer instructions, such as to process image data captured by the camera(s). Additional variations and implementations are also possible. For example, other types of cameras and/or image processing hardware and/or software can be used to achieve the effect of clear focus at all image depths.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A method of capturing motion using motion capture cameras, comprising:
    coupling a plurality of markers to an actor;
    positioning a material between the actor and said motion capture cameras but in front of the plurality of markers toward the motion capture cameras, wherein said material is selected as a mesh material that is substantially transparent to said motion capture cameras when the markers are illuminated with a light source such that the plurality of markers is visible to the motion capture cameras, and the mesh material is visible to the actor so that the actor interacts with said material and physical movements of the actor appear natural for a person interacting with such a material; and
    capturing the motion of said markers.

2. The method of claim 1, wherein said material is selected to be substantially invisible to said motion capture cameras.

3. The method of claim 1, wherein said material includes a fabric.

4. The method of claim 3, wherein said fabric includes tulle.

5. The method of claim 3, wherein said fabric is configured as a garment, said garment including a theatrical costume.

6. A method of capturing motion using motion capture cameras, comprising:

coupling a plurality of markers to an actor;

positioning a material between the actor and said motion capture cameras but in front of the plurality of markers toward the motion capture cameras, wherein said material is selected to be substantially transparent to said motion capture cameras when the markers are illuminated with a light .source such that the plurality of markers is visible to the motion capture cameras, and the material is visible to the actor so that the actor interacts with said material and physical movements of the actor appear natural for a person interacting with such a material; and capturing the motion of said markers, wherein said material includes a mesh.

7. The method of claim 6, wherein said mesh is flexible.

8. The method of claim 6, wherein said mesh includes a metal screen and a metal wire frame.

9. A method of capturing motion using motion capture cameras, comprising:

coupling a plurality of markers to an actor;

positioning a material between the actor and said motion capture cameras but in front of the plurality of markers toward the motion capture cameras, wherein said material is selected as a mesh material that is substantially transparent to said motion capture cameras when the markers are illuminated with a light source such that the plurality of markers is visible to the motion capture cameras, and the mesh material is visible to the actor so that the actor interacts with said material and physical movements of the actor appear natural for a person interacting with such a material; and capturing the motion of said markers, wherein said material is configured as a theatrical prop, the prop being separate from any clothing the actor is wearing.

10. A system for capturing motion using motion capture cameras, comprising:

a plurality of markers coupled to an actor;

a plurality of motion capture cameras configured to capture motion of said plurality of markers; and a material positioned between the actor and said plurality of motion capture cameras but in front of the plurality of markers toward the motion capture cameras, wherein said material is selected as a mesh material that is substantially transparent to said motion capture cameras when the markers are illuminated with a light source such that the plurality of markers is visible to the plurality of motion capture cameras, and the mesh material is visible to the actor so that the actor interacts with said material and physical movements of the actor appear natural for a person interacting with such a material.

11. The motion capture system of claim 10, wherein said material includes a fabric.

12. The motion capture system of claim 11, wherein said fabric includes tulle.

13. The motion capture system of claim 11, wherein said fabric is configured as a garment, said garment including a theatrical costume.

14. The motion capture system of claim 10, further comprising a motion capture processing module configured to determine a location and a movement of at least one of said plurality of motion capture markers.

15. A system for capturing motion using motion capture cameras, comprising:

a plurality of markers coupled to an actor;

a plurality of motion capture cameras configured to capture motion of said plurality of markers; and a material positioned between the actor and said plurality of motion capture cameras but in front of the plurality of markers toward the motion capture cameras, wherein said material is selected to be substantially transparent to said motion capture cameras when the markers are illuminated with a light source such that the plurality of markers is visible to the motion capture cameras, and said material is visible to the actor so that the actor interacts with said material and physical movements of the actor appear natural for a person interacting with such a material, wherein said material includes a mesh.

16. The motion capture system of claim 15, wherein said mesh is flexible.

17. The motion capture system of claim 15, wherein said mesh includes a metal screen and a metal wire frame.

18. A system for capturing motion using motion capture cameras, comprising:

a plurality of markers coupled to an actor;

a plurality of motion capture cameras configured to capture motion of said plurality of markers; and a material positioned between the actor and said plurality of motion capture cameras but in front of the plurality of markers toward the motion capture cameras, wherein said material is selected as a mesh material that is substantially transparent to said motion capture cameras when the markers are illuminated with a light source such that the plurality of markers is visible to the o capture cameras, and the mesh material is visible to the actor so that the actor interacts with said material and physical movements of the actor appear natural for a person interacting with such a material, wherein said material is configured as a theatrical prop, the prop being separate from any clothing the actor is wearing.

19. An apparatus for capturing motion using motion capture cameras, comprising:

means for coupling a plurality of markers to an actor;

a mesh material positioned between the actor and said motion capture cameras but in front of the plurality of markers toward the motion capture cameras, wherein said mesh material is selected to be substantially transparent to said motion capture cameras when the markers are illuminated with a light source such that the plurality of markers are visible to the motion capture cameras, and the mesh material is visible to the actor so that the actor interacts with said material and physical movements of the actor appear natural for a person interacting with such a material; and means for capturing the motion of said markers.

* * * * *